United States Patent [19]

Pawelzik et al.

[11] Patent Number: 5,060,692
[45] Date of Patent: Oct. 29, 1991

[54] SEAL RING FOR SINGLE-CONTROL FAUCET

[75] Inventors: Manfred Pawelzik, Soest; Horst Titze, Hagen, both of Fed. Rep. of Germany

[73] Assignee: Friedrich Grohe Armaturenfabrik GmbH & Co., Hemer, Fed. Rep. of Germany

[21] Appl. No.: 610,253

[22] Filed: Nov. 7, 1990

[30] Foreign Application Priority Data

Nov. 7, 1989 [DE] Fed. Rep. of Germany ....... 3936983

[51] Int. Cl.⁵ ............................................ F16K 11/02
[52] U.S. Cl. .......................... 137/625.4; 137/625.17; 277/27; 277/70; 277/206 R
[58] Field of Search ....................... 137/625.17, 625.4; 277/27, 70, 206 R

[56] References Cited

FOREIGN PATENT DOCUMENTS 3244120 5/1984 Fed. Rep. of Germany .
3318888 11/1984 Fed. Rep. of Germany .

*Primary Examiner*—Gerald A. Michalsky
*Attorney, Agent, or Firm*—Herbert Dubno; Andrew Wilford

[57] ABSTRACT

A seal ring is used in combination with a pair of substantially planar, confronting, and substantially parallel faces one of which is formed with an annular groove surrounding a pressurizable chamber and having inner and outer flanks extending transverse to the respective plate face. These faces are relatively slidable and can be formed on a valve plate and a control plate of a single-control valve. The ring is formed with an outer edge normally engaging outward against the outer flank of the groove, an inwardly projecting ridge defining an inner edge normally engaging inward against the inner flank of the groove, and a pair of lips flanking the ridge and each defining therewith an inwardly open groove. Each lip has an outer end lying outward of the inner edge and inward of the outer edge.

8 Claims, 3 Drawing Sheets

SEAL RING FOR SINGLE-CONTROL FAUCET

FIELD OF THE INVENTION

The present invention relates to a seal ring. More particularly this invention concerns such a seal ring used between the valve and control plates of a single-control faucet.

BACKGROUND OF THE INVENTION

A standard mixing valve (see U.S. Pat. Nos. 4,621,659 and 4,540,023 and German patent document 3,318,888) used in a single-lever faucet has a normally cylindrical housing centered on an axis and a valve plate closing the bottom of the housing and formed with a hot-water inlet port, a cold-water inlet port, and an outlet port. A control plate carried on a backing plate sits flat atop this valve plate and is formed with a cavity that normally overlies the outlet port and that can also be brought into registration over the inlet ports, either singly or jointly. A lever pivoted on the housing is connected via the backing plate to this control plate to slide and rotate it atop the valve plate, thereby determining the amount of overlap of the control-plate cavity with the inlets to determine the amounts of hot and cold water to be shunted through this cavity to the outlet port.

Although the confronting faces of the normally ceramic control and valve plates are normally machined to perfect smoothness and planarity and are greased, it is standard as discussed in German patent document 3,244,120 to provide a lip-type seal surrounding the ports of the valve plate. Such a seal is of V-or X-section with the arms of the V or X lying against the confronting faces of the control and valve plates.

The main problem with such a seal is that the lips can get caught in the gap that can form between the plate faces. Such wedging not only holds the two plates apart, but can lead to damage of the seal.

OBJECTS OF THE INVENTION

It is therefore an object of the present invention to provide an improved seal for use around a pressurized chamber formed at two parallel planar surfaces.

Another object is the provision of such an improved seal for use around a pressurized chamber formed between two parallel planar surfaces which overcomes the above-given disadvantages, that is whose lips cannot get caught between the surfaces.

A further object is to provide such a seal ring particularly usable between the control and valve plates of a single-control faucet.

SUMMARY OF THE INVENTION

The instant invention is a seal ring used in combination with a pair of substantially planar, confronting, and substantially parallel faces one of which is formed with an annular groove surrounding a pressurizable chamber and having inner and outer flanks extending transverse to the respective plate face. These faces can be formed on the control plate and backing plate of a single-control valve. The ring is formed with an outer edge normally engaging outward against the outer flank of the groove, an inwardly projecting ridge defining an inner edge normally engaging inward against the inner flank of the groove, and a pair of lips flanking the ridge and each defining therewith an inwardly open groove. Each lip has an outer end lying outward of the inner edge and inward of the outer edge.

Thus with the system of this invention pressure in the grooves pushes the lips outward and makes them seal tightly. The ridge however prevents the lips from getting trapped between the two surfaces.

According to another feature of this invention the seal ring has a predetermined radial thickness measured between its inner and outer edges and the lip outer ends lie outward from the inner edge by a distance equal to about one-quarter of the predetermined thickness. In addition the grooves are V-shaped and have flanks forming an angle of about 70°. The lips have curved surfaces and the groove has a base engaging one of the curved surfaces and the other curved surface engages the other plate face. The seal ring has a Shore hardness of about A50.

For best sealing action according to this invention the seal is formed with at least one passage extending generally parallel to the edges and communicating between the grooves. Thus pressure can get past the ridge to both grooves, ensuring that both lips are pressed against the respective surfaces.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
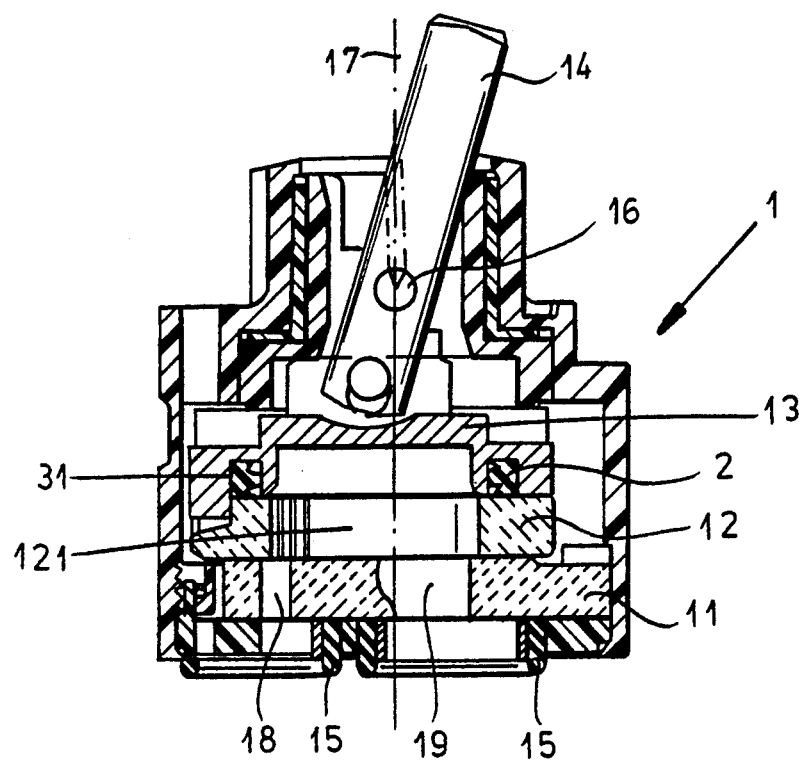
FIGS. 1 and 2 are vertical sections taken through 90° offset planes through a valve insert according to this invention.
Figure 2:
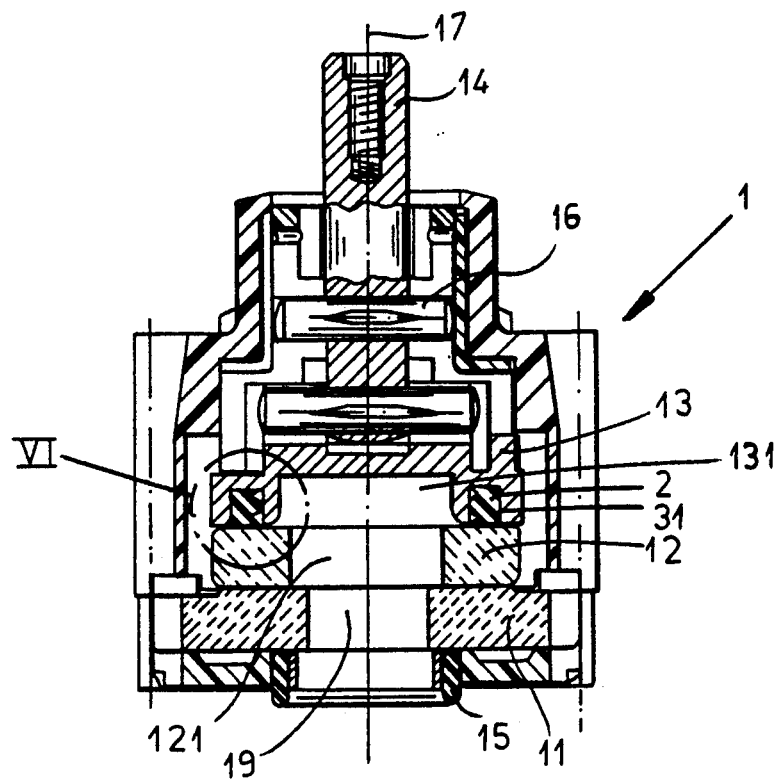

As seen in FIGS. 1 and 2 a valve insert 1 according to this invention has a valve plate 11 formed with inlet ports 18 (only one shown) and an outlet port 19, both opening at an upper surface of the plate 11. Underneath these ports 18 and 19 compressible seal rings 15 are provided which urge this plate 11 upward in the insert 1. Lying atop this plate 11 is a control plate 12 formed with a central mixing port 121 and lying in turn atop the control plate 12 is a backing plate 13 formed with a cavity 131 aligned with the port 121. The two plates 11 and 12 are made of a hard ceramic and the plate 13 is generally fixed to the plate 12.

A lever 14 is pivoted at 16 in the insert 1 and atop the backing plate 12 and can swivel about a central axis A of the insert 1 to move the plate assembly 12, 13 on the stationary valve plate 11 and thereby control flow from the inlet ports 18 to the outlet ports 19.

Figure 3:
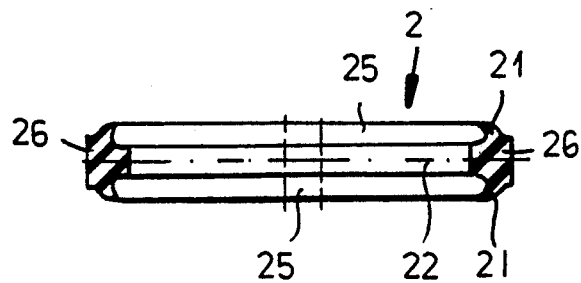
FIG. 3 is a vertical large-scale section through the seal ring of this invention.
Figure 4:
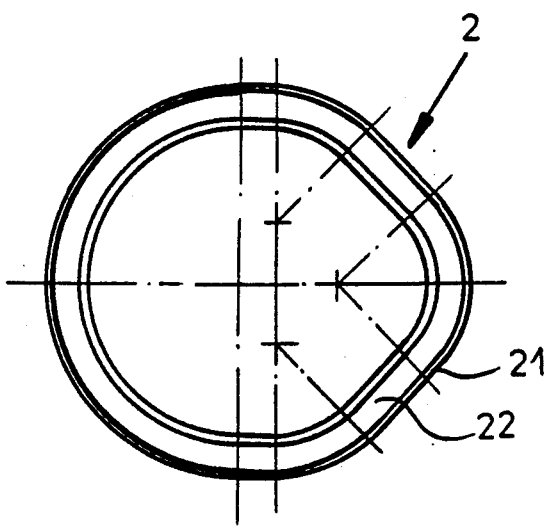
FIG. 4 is a top view of the seal ring.
Figure 5:
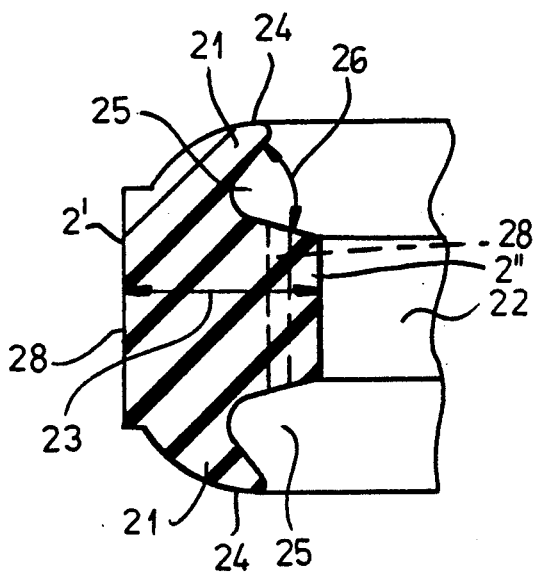
FIG. 5 is a large-scale section through a portion of the ring.

A seal 2 is provided in a square-section groove 31 (See FIGS. 6 and 7) formed in the lower face of the backing plate 13, this groove 31 having cylindrical inner and outer flanks and a planar flat floor bridging them and is open downward at the upper face of the ceramic valve plate 12. As also seen in FIGS. 3, 4, and 5, this seal 2, which is made of an elastomer of a Shore hardness of A 50, has a pair of lips 21 flanking a central inwardly projecting ridge 22 and defining therewith a pair of inwardly open grooves 25 forming angles 26 of about 70°. The seal 2 has a radial thickness 23 of 2.6mm and the lips 21 have outer ends that lie about three-quarters of the way from the cylindrical outer edge 2' to the cylindrical inner edge 2" of this seal 2. In addition the lips 21 have rounded outer surfaces 24 that normally engage the respective surfaces of the plates 13 and 12. Finally the ridge 22 is formed with at least one axially throughgoing hole or passage 28 communicating between the inwardly open V-shaped grooves 25.

Figure 6:
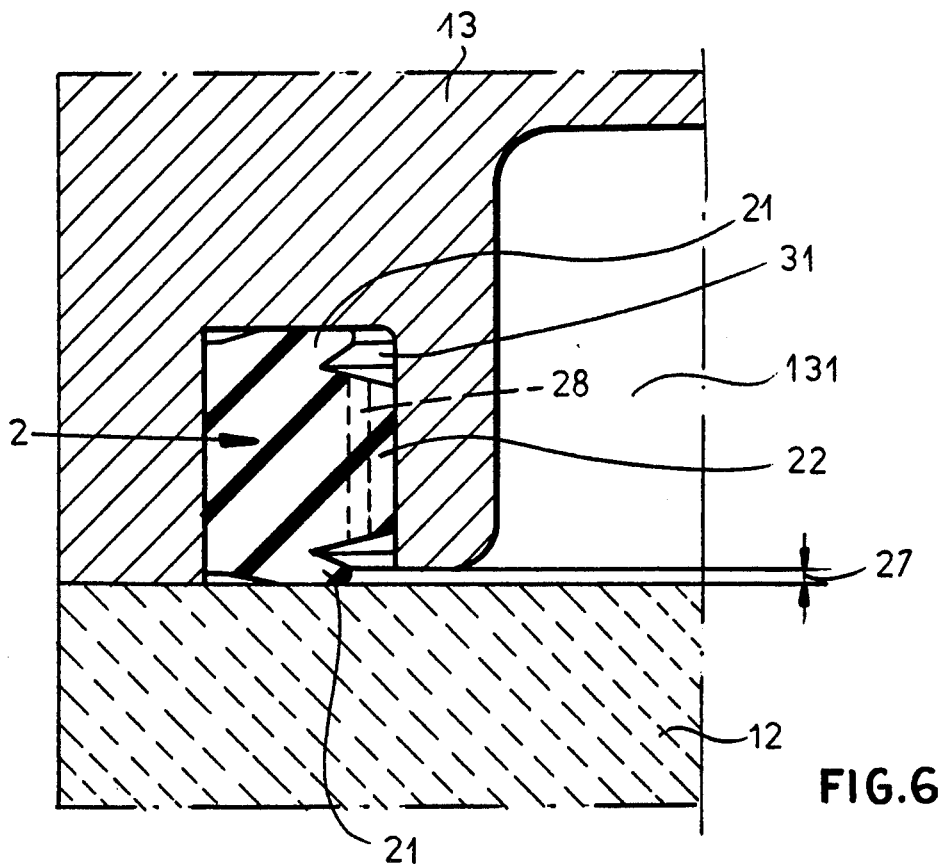
FIGS. 6 and 7 are large-scale views of the detail indicated at VI in FIG. 2, in two different positions.
Figure 7:
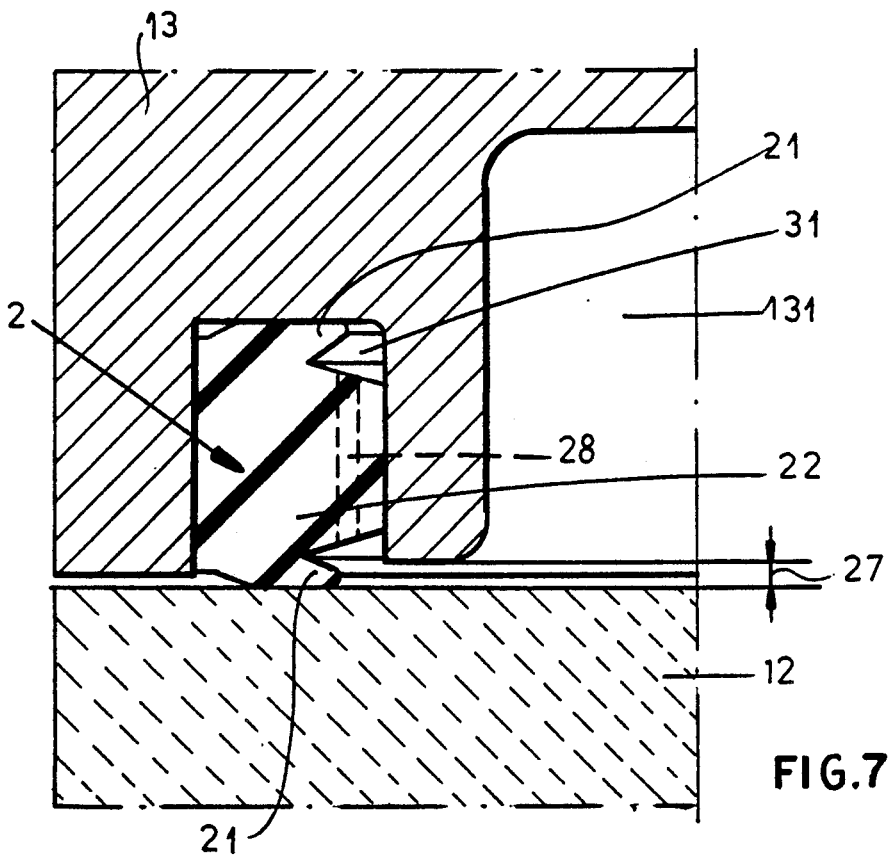

Thus as seen in FIGS. 6 and 7 pressure in the chamber formed by the cavity 131 of the plate 13 can pass through a gap 27 between the confronting parallel surfaces of these plates 12 and 13 to pressurize the lower groove 25 and force the lower lip 21 downward into contact with the top face of the plate 12. This pressure is also transmitted through the passage 28 to the top groove 25 where it pushes the top lip 21 similarly upward into contact with the floor of the groove 31. Thus even as the size of the gap 27 increases as illustrated in FIG. 7, a good seal will be maintained. At the same time the fact that the ridge 22 protrudes inward past the free ends of the lips 21 ensures that the lower lip 21 cannot get caught between the plates 12 and 13.

We claim:

1. In combination with a pair of substantially planar, confronting, and substantially parallel faces one of which is formed with an annular groove surrounding a pressurizable chamber and having inner and outer flanks extending transverse to the respective plate face, a seal ring formed with an outer edge normally engaging outward against the outer flank of the groove;

an inwardly projecting ridge defining an inner edge normally engaging inward against the inner flank of the groove; and a pair of lips flanking the ridge and each defining therewith an inwardly open groove, each lip having an outer end lying outward of the inner edge and inward of the outer edge.

2. The seal ring defined in claim 1 wherein the seal ring has a predetermined radial thickness measured between its inner and outer edges and the lip outer ends lie outward from the inner edge by a distance equal to about one-quarter of the predetermined thickness.

3. The seal ring defined in claim 1 wherein the grooves are V-shaped and have flanks forming an angle of about 70°.

4. The seal ring defined in claim 1 wherein the lips have curved surfaces, the groove having a base engaging one of the curved surfaces and the other curved surface engaging the other plate face.

5. The seal ring defined in claim 1 wherein the seal ring has a Shore hardness of about A50.

6. The seal ring defined in claim 1 wherein the seal is formed with at least one passage extending generally parallel to the edges and communicating between the grooves.

7. In combination with a pair of substantially planar, confronting, and substantially parallel faces one of which is formed with a annular groove surrounding a pressurizable chamber and having inner and outer flanks extending transverse to the respective plate face, a seal ring formed with an outer edge normally engaging outward against the outer flank of the groove;

an inwardly projecting ridge defining an inner edge normally engaging inward against the inner flank of the groove;

a pair of lips flanking the ridge and each defining therewith an inwardly open groove, each lip having an outer end lying outward of the inner edge and inward of the outer edge; and at least one passage extending generally parallel to the edges and communicating past the ridge between the grooves.

8. In a single-control faucet having a valve plate formed with a cold-water inlet port, a hot-water inlet port, and an outlet port;

a control plate formed with a mixing port and having a substantially planar face turned away from the valve plate and at which the mixing port opens;

a backing plate carrying the control plate and having a substantially planar face, formed with a cavity at which the mixing port opens, and formed around the cavity with an annular groove open toward the valve plate and having an inner flank, and outer flank, and a floor bridging the flanks; and means including an actuating lever for sliding the backing and control plates on the valve plate and thereby bringing the mixing port and cavity into different positions overlying and interconnecting the valve-plate ports, an elastomeric seal ring formed with:

an outer edge normally engaging outward against the outer flank of the groove;

an inwardly projecting ridge defining an inner edge normally engaging inward against the inner flank of the groove; and a pair of lips flanking the ridge and each defining therewith an inwardly open groove, each lip having an outer edge lying outward of the inner edge and inward of the outer edge, one of the lips engaging the floor of the groove and the other lip engaging the valve-plate surface.

* * * * *